United States Patent Office 3,641,012
Patented Feb. 8, 1972

3,641,012
STYRYL THIAZOLIUM SALTS
Arthur P. Phillips, East Chester, and Robert B. Burrows, Ardsley, N.Y., assignors to Burroughs Wellcome Co.
No Drawing. Filed Sept. 19, 1968, Ser. No. 760,966
Claims priority, application England, Sept. 22, 1967, 43,366/67
Int. Cl. C09b 23/14
U.S. Cl. 260—240.9                                    6 Claims

ABSTRACT OF THE DISCLOSURE

Styryl thiazolium salts of the following structures:

(1)

Y—⟨phenyl⟩—⟨phenyl⟩—[thiazole]—CH=CH—⟨phenyl⟩—N(R$_2$)
         |
         CH$_3$+   X$^-$ where Y is hydrogen or lower alkoxy
X$^-$ is an anion of a pharmaceutically acceptable acid
R is lower alkyl (i.e. methyl, ethyl, propyl etc.)

(2)

Y—⟨phenyl⟩—⟨phenyl⟩—[thiazole]—CH=CH—⟨phenyl⟩—N⟨pyrrolidine⟩
         |
         R'+   X$^-$ where Y is hydrogen or lower alkoxy
R' is lower alkyl
X$^-$ is an anion of a pharmaceutically acceptable acid.

The compounds are useful in eliminating nematodes (i.e. hookworms, pinworms, etc.) inhabiting the intestinal track of mammals such as dogs, cats etc.

---

This invention is directed to different groups of styryl thiazolium salts found to be effective in treating mammals infested with nematodes such as whipworms, pinworms etc. at oral doses of 5–25 mg. cation/kg. of body weight.

The first group of compounds according to the invention have the structural formula Y—⟨phenyl⟩—⟨phenyl⟩—[thiazole]—CH=CH—⟨phenyl⟩—N(CH$_3$)$_2$
         |
         CH$_3$+   X$^-$                                    (IA)

where

Y is hydrogen or lower alkoxy (methoxy, ethoxy, propoxy etc.)
X$^-$ is an anion of a pharmaceutically acceptable acid The second group of compounds have the structural formula Y—⟨phenyl⟩—⟨phenyl⟩—[thiazole]—CH=CH—⟨phenyl⟩—N⟨pyrrolidine⟩
         |
         R'+   X$^-$                                    (IB)

where

Y is hydrogen or lower alkoxy (methoxy, ethoxy, propoxy, etc.)
R' is lower alkyl (methyl, ethyl, propyl, etc.)
X$^-$ is an anion of a pharmaceutically acceptable acid.

The compounds of Formula IA and IB combine high activity against a variety of nematodes parasitic in the intestinal tract of mammals with a relatively low toxicity so that treatment through their use has a wide margin of safety. A number of related compounds have been reported previously. Many of these have appreciable anthelmintic activity but are usually less active than the compounds of this invention and are also more toxic.

The compounds of the present invention are conveniently prepared by the following reaction sequence:

Y—⟨phenyl⟩—⟨phenyl⟩—C(=O)—CH$_2$Br + S=⟨thiazoline⟩—CH$_3$ (with NH$_2$) →
                                   Step (a)

Y—⟨phenyl⟩—⟨phenyl⟩—[thiazole]—CH$_3$

Step (b)  R'X ↓

IA or IB ← OCH—⟨phenyl⟩—NR$_2$
              Step (c) base catalyst

Y—⟨phenyl⟩—⟨phenyl⟩—[thiazole]—CH$_3$
         |
         +R'   X$^-$

While many values of K$^-$ are comprehended in this invention, the most convenient way of introducing X$^-$ is in step b and it is therefore preferred to have X$^-$ correspond to the X of an R'X that is a satisfactory alkylating agent. Thus when R'S is methyl or ethyl iodide or bromide, the variants of I having X-I and Br are obtained directly whereas a chloride would have to be prepared from the iodide (or bromide) by a separate operation (as by exchange with silver chloride). The variants in which X$^-$ is a hydrocarbyl sulfonate (especially p-toluene sulfonate or methane sulfonate) are also prepared by using the appropriate sulfonate ester as R'X in step b. Similarly methyl sulfate may be employed to give the methyl sulfate salt. In general, the iodides are extremely satisfactory and are usually preferred. The anion X$^-$ does not contribute to the parasiticidal activity of the compounds and its identity is unimportant provided it is not itself markedly toxic, thus anions of pharmaceutically acceptable acids such as Cl$^-$, Br$^-$, I$^-$, SO$_4^-$, MeSO$_4^-$ or the like are suitable for the purposes of this invention.

The compounds of this invention are almost completely insoluble in water and are rather sparingly soluble in most organic solvents. They are frequently obtained in hydrated forms from which the water of crystallization is not readily removed. The higher-melting salts are not readily recrystallized and purity is best obtained by ensuring the purity of the reactants in step c (and especially their freedom from dust and inorganic contaminants) and by extracting the product several times with organic solvents such as methanol.

Especially preferred are the variants II, which has been shown to eliminate hookworms from dogs (*Ancylostoma caninum* and *Uncinaria stenocephala*) and cats (*Ancylostoma tubaeforme*) at doses of 5 mg./kg. and has an oral LD$_{50}$ (in mice) of 1650 mg./kg.

⟨phenyl⟩—⟨phenyl⟩—[thiazole]—CH=CH—⟨phenyl⟩—N(CH$_3$)$_2$
         |
         CH$_3$+   X$^-$                                    II and ⟨phenyl⟩—⟨phenyl⟩—[thiazole]—CH=CH—⟨phenyl⟩—N⟨pyrrolidine⟩
         |
         Et+   X$^-$                                    III which eliminates pinworms from mice at a dose level of 20 mg./kg. or less and is also of low toxicity.

3

The compounds of this invention can be administered to the host of the parasites in any fashion customary for such purposes as, for example, in a capsule or a suspension in water or syrup or embedded in a cube of gelatine or in a compressed tablet. Since, however, hookworms inhabit mainly the duodenum, any tablet intended to eliminate them should be such as to disintegrate rapidly after being swallowed. This would be less important if pinworms or whipworms which inhabit lower portions of the intestinal tract are the objects of treatment. Against hookworms, incorporation of the powdered drug in food is often advantageous. The compounds of this invention are normally administered in single oral doses at 5 to 25 mg. cation/kg. of body weight.

EXAMPLE 1

Step A

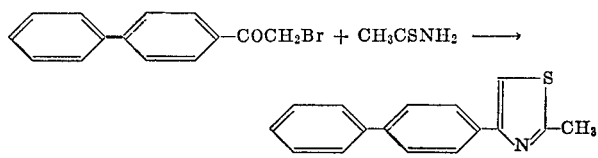

27.5 grams (0.1 M) of p-phenyl phenacyl bromide and 10 grams (0.133 M) of thioacetamide were mixed and heated in 150 cc. of methanol. The reaction mixture developed a strong acidic reaction almost at once. After heating at 100° for 1–2 hours part of the methanol was evaporated, water and ammonia were added thus precipitating the thiazole base. This was collected and purified by recrystallization from methanol and gave 23 grams of colorless crystals (90–95% yield) melting at 120–121° C.

Step B

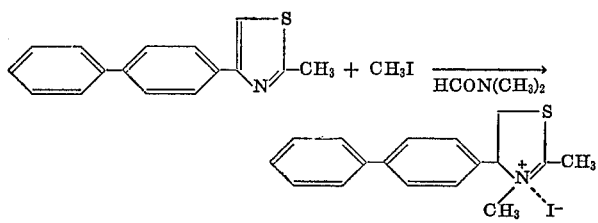

A solution of 25 grams (0.1 M) of 2-methyl-4-biphenylyl thiazole and 22 grams of methyl iodide in 70 cc. of dimethylformamide was heated for 6–8 hours at 100° C. Upon addition of excess ether, and cooling, there was obtained 30–32 grams (75–80%) of the methiodide product. After purification by digesting with hot methanol this had a melting point of 272–273° C.

Step C

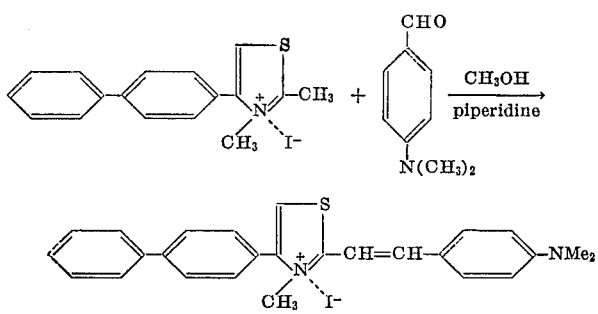

A suspension of 7.9 grams (0.02 M) of the thiazole methiodide and 4.5 grams (0.03+ M) of p-dimethylaminobenzaldehyde in 90 cc. of hot methanol containing 2 cc. of piperidine was heated at 100° (steam bath) for 2 hours. An insoluble red precipitate was formed in less than 5 minutes—but because the starting compound (thiazole methiodide) was rather insoluble in methanol—the reaction mixture was digested hot for about 2 hours to ensure nearly complete transformation of this insoluble reactant into the insoluble product. The product was collected, 10.5 grams (100%) from the cooled methanol and the solid

4 was washed well with methanol and with ether. After purification by digestions with hot methanol and washings with methanol and ether there was obtained 10 grams (95+%) of red crystals melting at 255–256° C. The corresponding bromide salt melts at 252–254°.

EXAMPLE 2

2-(p-dimethylaminostyryl)-3-methyl-4-(p-biphenyl) thiazolium p-toluenesulphonate 2 - methyl - 4 - biphenylyl thiazole (25.1 grams; 0.100 mole), dimethylformamide (100 ml.) and methyl-p-toluenesulphonate (37.2 grams; 0.200 mole) were mixed and heated on the steam bath at 80–90° C. for a period of 43 hours. The solid which crystallized on cooling was filtered, washed with ether and recrystallized from isopropanol to give a product melting at about 180–182° C.

2,3-dimethyl - 4 - p - biphenylylthiazolium p - toluenesulphonate (26.0 grams; 0.594 mole), p-dimethylaminobenzaldehyde (13.4 grams; 0.0893 mole), methanol (275 ml.) and piperidine (6.3 ml.) were mixed and heated at reflux for 19 hours. The red solid which crystallized on cooling was filtered, washed with ether and recrystallized from methanol to give a product melting at about 248–254° C.

EXAMPLE 3

2-(p-dimethylaminostyryl)-3-methyl-4-(p-biphenylyl) thiazolium methylsulphate 2-methyl-4-biphenylylthiazole (9.0 grams; 0.036 mole), dimethylformamide (40 ml.) and dimethylsulphate (5.0 grams; 0.040 mole) were mixed and heated on a steam bath at 80–90° C. for a period of 18 hours. The solid which crystallized upon cooling was recrystallized from ethanol to give a product melting at about 235–240° C. (decomp.).

2,3-dimethyl - 4 - p-phenylylthiazolium methylsulphate (4.0 grams; 0.0106 mole), p-dimethylaminobenzaldehyde (2.4 grams; 0.0160 mole), methanol (50 ml.) and piperidine (1.0 ml.) were mixed in the cold and then heated at reflux for 18 hours. On cooling and the addition of an excess of ether a red solid was precipitated which was filtered, washed with ether and dried at 80° C. to give a red-coloured solid; the product melted at about 210–225° C.

In a further experiment, the product melted at 240–245°.

EXAMPLE 4

(a) 2-methyl-4-(p-biphenylylthiazole) ethiodide

A mixture of 10 grams (0.04 M) of 2-methyl-4-(p-biphenylyl)thiazole, 25 cc. of dimethylformamide, and 10 cc. of ethyl iodide was refluxed on a steam bath for 48 hours. After cooling the mixture was diluted with excess ether and gave 6.5 g. (40%) of the ethiodide. After two recrystallizations from methanol-ether mixtures 6.5 grams of purified product was obtained which melted at 236–237° C.

The original dimethylformamide-ether soluble filtrates from the first crop—upon evaporation to dryness gave about 10 g. more of crude seconds and/or starting material. This 10 grams of seconds was refluxed for two days longer in 25 cc. of DMF with 10 cc. of ethyl iodide and then gave 8.5 grams of seconds M.P. 218–220° C. After two recrystallizations from methanol-ether 6.6 grams of material melting at 229–232° C. was obtained — which was used for condensations.

(b) 2-(p-pyrrolidinostyryl)-4-(p-biphenylyl) thiazole ethiodide

A mixture of 4.1 grams (0.01 M) of the thiazole ethiodide (a), 2.7 grams (0.015 M) of p-pyrrolidinobenzaldehyde, 40 cc. of methanol and 2 cc. of piperidine was heated for ½ hour on a steam bath. The dark insoluble product had precipitated in about 5–10 minutes. After cooling the product was filtered and washed first with methanol and then with ether; yield was 5.7 grams (100%). After two or three separate digestions in 80 cc. portions of hot methanol and after cooling, filtering and washing with methanol and with ether, 5.2 grams (95%) of the purified product was obtained which melted at 264–265° C. (with decomp.). The compound underwent a distinct color change at about 242–245° C.—from dark to orange-yellow—perhaps associated with the loss of ethyl iodide.

By the same procedures were prepared

EXAMPLE 5

2-[p-pyrrolidinostyryl]-3-methyl-4-p-biphenylyl thiazolium iodide, M.P., 262–263°

EXAMPLE 6

2-[p-dimethylaminostyryl]-3-methyl-4-p-methoxybiphenylyl thiazolium iodide, M.P. 280–281° C.

EXAMPLE 7

2-[p-pyrrolidinostyryl]-3-methyl-4-p-methoxybiphenylyl thiazolium iodide, M.P. 279–280° C.

The other compounds of this invention set forth in the general Formulas IA or IB are conveniently made using the same procedures as noted above.

What is claimed:
1. A compound

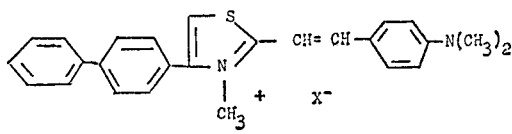

where X⁻ is an anion of a pharmaceutically acceptable acid.

2. A compound according to claim 1 in which the anion is iodide.

3. A compound of the formula

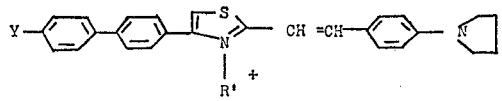

wherein Y is selected from the class consisting of lower alkoxy and hydrogen, wherein R' is lower alkyl and wherein X⁻ is the anion of a pharmaceutically acceptable acid.

4. A compound according to claim 3 in which the anion is iodide.

5. A salt of 2-(p-pyrrolidinostyryl)-3-ethyl-4-p-biphenyl thiazolium cation with the anion of a pharmaceutically acceptable acid.

6. A salt according to claim 5 wherein the anion is iodide.

References Cited

UNITED STATES PATENTS

| | | | |
|---|---|---|---|
| 3,075,975 | 1/1963 | Phillips et al. | 260—240.9 |
| 3,085,935 | 4/1963 | Phillips et al. | 167—53 |

OTHER REFERENCES

Sych, Chemical Abstracts, vol. 52, cols. 18377 to 18378 (1958). (Abstracting Sych, Ukrain. Khim. Zhur., vol. 24, pages 79–88, 1958). Chemical Abstracts, Sixth Collective Index, Sp-Z, pages 11637s and 11638s (1966).

Venkataraman: The Chemistry of Synthetic Dyes, vol. II, pages 1185–6, Academic Press Inc., N.Y. (1952).

Hamer: The Cyanine Dyes and Related Compounds, page 731 (1964), Interscience Publishers, N.Y.

Sych: Ukrain. Khim. Zhur., vol. 24, pages 79 to 88 (1958).

JOHN D. RANDOLPH, Primary Examiner

U.S. Cl. X.R.

424—270; 260—302

UNITED STATES PATENT OFFICE
CERTIFICATE OF CORRECTION

PO-1050 (5/69)

Patent No. 3,641,012                    Dated FEBRUARY 8, 1972

Inventor(s) Arthur P. Phillips, and Robert B. Burrows

It is certified that error appears in the above-identified patent and that said Letters Patent are hereby corrected as shown below:

In the abstract, column 1, lines 14-17, the formula should appear as follows:

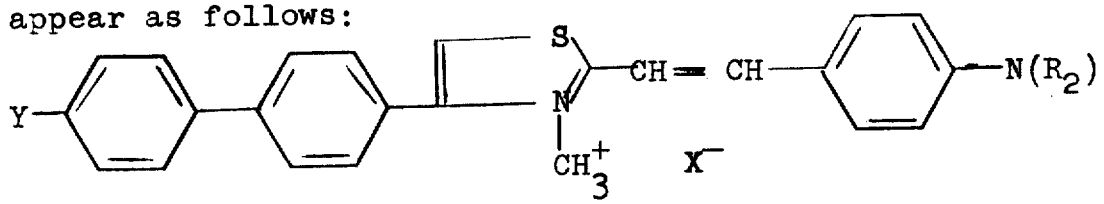

Column 1, lines 23-27, the formula should appear as follows:

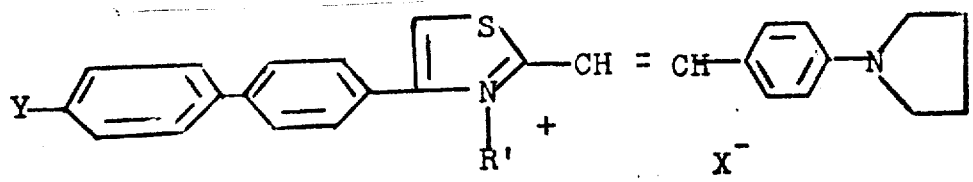

Column 3, lines 38-42, the formula should appear as follows:

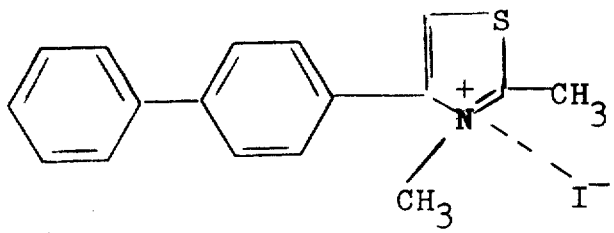

Signed and sealed this 27th day of February 1973.

(SEAL)
Attest:

EDWARD M. FLETCHER, JR.
Attesting Officer

ROBERT GOTTSCHALK
Commissioner of Patents